FIG.1

INVENTORS
GEORGE W. GOETZ
NORMAN W. WEINSTEIN
BY
ATTORNEY

Nov. 4, 1969  G. W. GOETZ ET AL  3,476,172
METHODS OF DIE CASTING MATERIALS OF RELATIVELY
HIGH MELTING TEMPERATURES
Original Filed Feb. 8, 1966   5 Sheets-Sheet 2

INVENTORS
GEORGE W. GOETZ
NORMAN W. WEINSTEIN
BY
J. B. Felshin
ATTORNEY

INVENTORS
GEORGE W. GOETZ
NORMAN W. WEINSTEIN
BY
J.B. Felshin
ATTORNEY.

INVENTORS
GEORGE W. GOETZ
NORMAN W. WEINSTEIN
BY
J.B. Felshin
ATTORNEY.

United States Patent Office 3,476,172
Patented Nov. 4, 1969

3,476,172
METHODS OF DIE CASTING MATERIALS OF RELATIVELY HIGH MELTING TEMPERATURES
George W. Goetz, Red Hook, N.Y., and Norman W. Weinstein, Philadelphia, Pa., assignors to Impact Casting Co., Inc., New York, N.Y., a corporation of New York
Original application Feb. 8, 1966, Ser. No. 525,987, now Patent No. 3,435,880, dated Apr. 1, 1969. Divided and this application July 16, 1968, Ser. No. 745,157
Int. Cl. B22d 35/04
U.S. Cl. 164—133       4 Claims

ABSTRACT OF THE DISCLOSURE

The disclosed method is for casting materials in a permanent mold and comprises the steps of ejecting a liquid molten mass of the metal into free fall in space and enveloping at rest a large portion of the mass while in free fall, in timed reltaion to ejection of the mass. In accordance with this method the mass is ejected upwardly into free fall and the mass is enveloped and molded by closing die means on said mass while in free fall. The mass is ejected from a chamber containing the liquid metal. The level of the molten metal in said chamber is adjusted to a predetermined level before ejecting the mass. Additional metal is fed to the molten metal in the chamber, and the timing of the steps of feeding metal and adjusting the level is co-related so that the feeding occurs before the level adjustment in a casting cycle.

---

This application is a division of our copending application Ser. No. 525,987 filed Feb. 8, 1966 for Apparatus for Die Casting Materials of Relatively High Melting Temperatures.

This invention relates to die casting, and more specifically to a method for casting materials, particularly metals and alloys of metals, having relatively high melting temperatures, in a split mold by closing the mold halves on a liquid drop or mass of such alloy while said drop is momentarily at rest while in free fall.

The term "free fall" as used herein is intended to describe that condition of a body wherein it is not in contact with any other body and is acted upon by gravity.

It is an object of this invention to provide a method of the character described which can be used to die cast steel.

Heretofore, many problems have been present in attempting to die cast high melting temperature alloys such as steel. One problem is that the mold would melt or deform due to the high temperature of the molten steel. Materials which will withstand these temperatures are unsuitable because of their other properties, for example, ceramics are brittle, and materials such as tungsten will oxidize.

In the mold of this invention this problem is solved because means are provided to bring the temperature of the mold to substantially room temperature at the start of each casting cycle.

Another problem concerns entry time into the mold. It is difficult, if not impossible, to work steel by conventional plastic molding techniques, such as by cold mold or by injection molding, because the steel would "freeze" in the entry openings or would melt the die. The reason for this is that steel has a relatively low specific heat, that is, a relatively small thermal capacity per unit mass, which means that when the steel gives up a relatively small amount of heat, especially in an area of small cross-section such as in an entry port or runner, it will rather quickly solidify or "freeze" therein rather than flow into and fill the mold cavities.

This problem is eliminated in the present invention since the melt enters the mold quickly, on the order of .001 seconds, and in the form of a discrete drop or bolus. The melt does not contact the mold at all until the die halves close on the bolus, and therefore the time of contact as the die closes is minimal. The die remains closed until the melt hardens therein to form the casting.

Advantages are obtained with the present invention over the conventional methods of working steel such as sand casting and forging. Less machinery is required, and castings are obtained with greater dimensional accuracy, better surface finish, smaller minimum wall thickness and at less cost than those made by sand casting; and materials which cannot be forged can be worked by the present invention.

Another problem encountered when attempting to die cast steel is that a metal pressure plunger may not be used because it would melt upon contact with the molten steel. This problem is solved in the present invention by providing a body or "plunger" of liquid salt and transferring the pressure to the liquid steel via this liquid salt "plunger."

Accordingly, another object of this invention is to provide a method of the character described wherein the apparatus to carry out the method comprises a roughy U-shaped chamber with the liquid alloy filling the cross piece of the chamber and extending upwardly to the upper end of one leg and to a height spaced between the ends of the other leg, heating means to maintain the alloy in said chamber in a liquid state, the upper end of said one leg being formed into a nozzle to expel a drop of the liquid alloy upwardly when pressure is applied to the surface of the alloy in said other leg, the split mold halves being positioned above the nozzle, and means to close the mold halves on the drop when the drop is momentarily at rest while in free fall.

A further object of this invention is to provide a method of the character described wherein the body of liquid salt is provided in said other leg above the surface of the liquid alloy therein, and a body of liquid oil is provided above said body of liquid salt, said other leg being provided with means operating on said body of liquid oil to control the level of the alloy at said nozzle and to apply the downward pressure on the liquid alloy to expel said drop.

Yet another object of this invention is to provide a method of the character described wherein the top of said other leg is open, and feed means are provided to drop quantities of said alloy in a solid state into said top open end to replenish the liquid alloy in the chamber as castings are produced, and said bodies of liquid oil and liquid salt permitting the passage of said solid alloy quantities therethrough under the influence of gravity.

Yet a further object of this invention is to provide a method of the character described wherein automatic control means are provided, said control means including means to sense the level of said alloy at said nozzle and means to coordinate the level sensed with said feed means and said level controlling means, and said control means further comprising means to coordinate the operation of said drop expelling means and the means to close the mold halves on said drop.

Still another object of this invention is to provide a method of the character described which will be economical, which may be used to cast many different materials, which will be substantially fully automatic for continuous production of castings, and which shall be practical and efficient to a high degree in use.

Other objects of this invention will in part be obvious and in part hereinafter pointed out.

The invention accordingly consists in the steps which will be exemplified in the apparatus and method hereinafter described, and of which the scope of invention will be indicated in the following claims.

In the accompanying drawing in which is shown an illustrative embodiment of this invention.

Referring now in detail to the drawing, 10 designates a machine embodying the invention. Machine 10 comprises a heating chamber 12 of U shape comprising a cross arm portion 14, interconnecting a pair of leg portions 16 and 18. The cross-sections of portions 14, 16 and 18 are preferably circular. Chamber 12 is preferably made of ceramic material to resist destruction by the molten steel or other molten material M therein. The top end of leg 16 is formed into a nozzle 20. An insert 21 is provided in the nozzle and is removably held therein by any suitable means to vary the size thereof. Means are provided to heat the melt M in chamber 12. To this end water cooled induction heating means are wrapped around chamber 12. Such heating means are well known and may comprise a single piece of copper tubing 22 formed into coils 24 surrounding substantially all of the chamber, with melt temperature controlling means 25, FIG. 13, which may include a platinum-rhodium thermocouple 27 to directly sense the melt's temperature, to control the supply of electricity to the wall of the tubing, and means (not shown) to run water or other coolant through the tubing.

Figure 7:
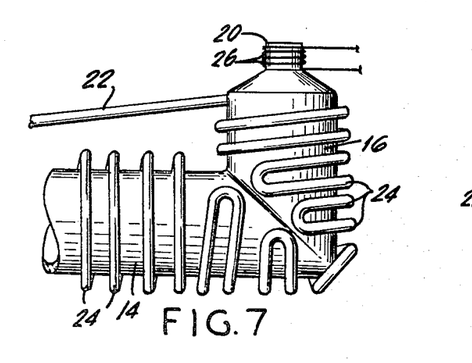
FIG. 7 is an elevational view of a portion of the apparatus.

Wrapped around nozzle 20 is an impedance coil 26, FIG. 7, the purpose of which will appear hereinafter. A plug or body of liquid salt 28, such as NaOH or KOH, is in leg portion 18 above the level of melt M therein. This salt acts as a piston as will appear more clearly hereinafter.

Mounted on the top open end of leg portion 18 and sealed thereto by any suitable means, is a member 30. Member 30 is vertically disposed, may be of circular cross section, is preferably made of steel, and comprises a bottom flange portion 32 to connect leg portion 18 to member 30, and a tubular portion 34 extending upwardly therefrom to the level of dispenser piston cylinder 36. Cylinder 36 is held in place by threads 35, so that different size cylinders can be used for different weight castings. Cylinder 36 extends outwardly from member 30 with its axis in a horizontal plane.

Slidably mounted in cylinder 36 is a piston and rod assembly 38 which is spring biased away from the axis of member 30 by means of a spring 40 interposed between a collar 42 on the piston and a fixed stop 44. Suitable guide means 46 for the piston are provided. Piston 36 is formed with teeth 43 which mesh with a gear 50 mounted on a shaft 52. The operation of the dispenser piston is explained below.

Figures 2, 4, 11:
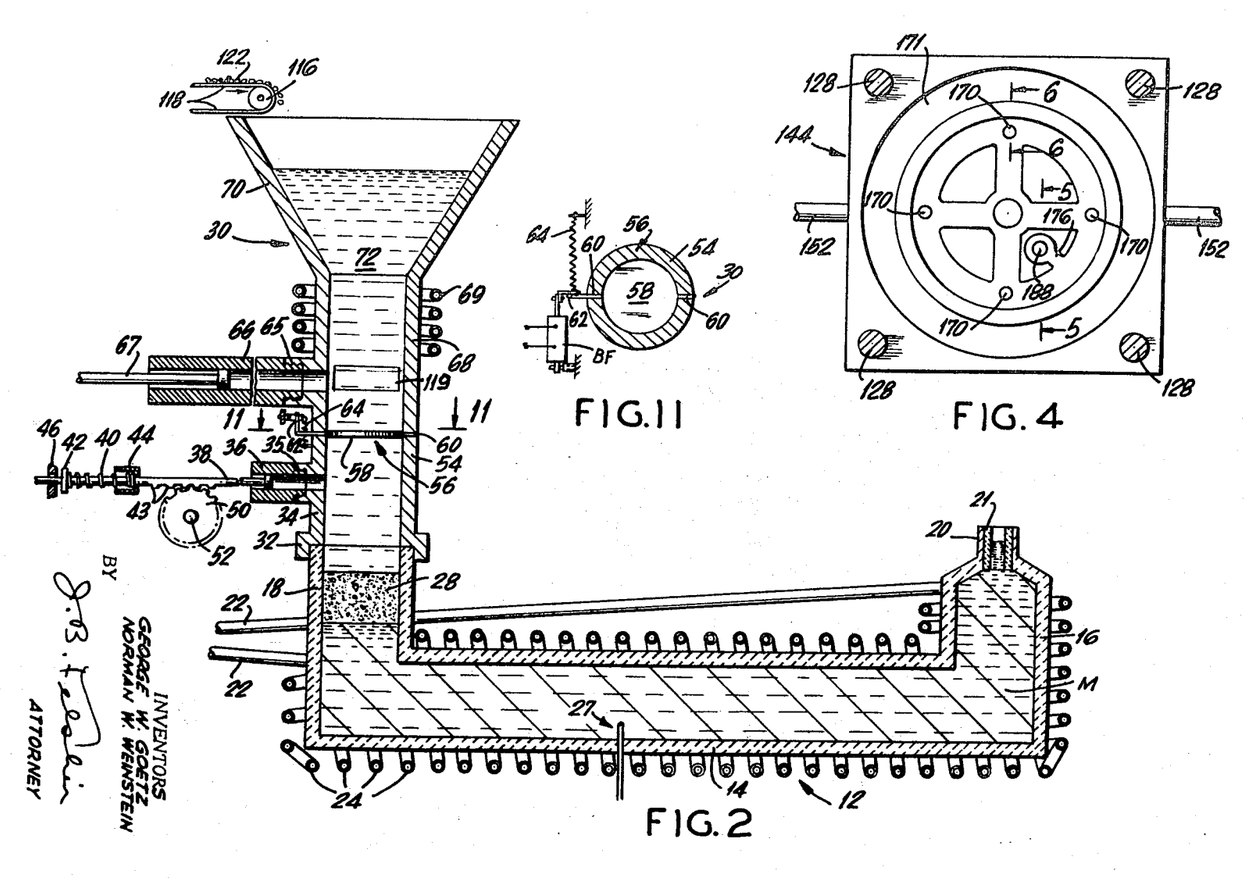
FIGS. 2 and 3 are cross-sectional views taken on lines 2—2 and 3—3 of FIG. 1; respectively.
FIG. 4 is a cross-sectional view taken on line 4—4 of FIG. 3.
FIG. 11 is a cross-sectional view taken on line 11—11 of FIG. 2.

A tubular portion 54 of member 30 extends upwardly from the level of cylinder 36 and is provided with a butterfly valve 56, FIG. 11. Valve 56 comprises a valve plate 58 which when disposed perpendicular to the axis of portion 54 seals said portion. A pair of bearing studs 60 extend outwardly from the opposite ends of a diameter of plate 58 and are sealingly journalled in portion 54 by any suitable means. One stud 60 has a crank arm extension 62 to which are fixed one end of a spring 64 and the armature of a solenoid BF. The other end of spring 64 is connected to any adjacent fixed part of the apparatus. The arrangement of spring and solenoid is such that the spring normally holds the valve plate in the vertical position so that portion 54 is not sealed, and the solenoid, when energized, pulls on crank arm 62 against the force of the spring to rotate the valve plate to the horizontal position to seal portion 54.

Portion 54 terminates at the height of level control piston cylinder 66, which may be joined to member 30 by threads 65 so as to permit the use of different size cylinders, and which is disposed in a horizontal plane. A piston and rod assembly 67 is slidably fitted in cylinder 66. Extending above cylinder 66 is tubular portion 68. Member 30 terminates at its upper end in an open ended funnel-shaped portion 70 extending from the upper end of portion 68. Member 30, and cylinder 36 and 66 up to the inner faces of the pistons therein, is filled with a fluid 72, such as oil. Coils 69 surround portion 68 and serve to cool fluid 72.

A molten salt interface between the oil and molten metal is necessary for metals that melt in the neighborhood of 2800° F. The reflexing salt mixture (NaCl+NaOH)

is a temperature buffer for the oil which allows use of a metal dispenser piston. Since the salts and metals are immisible, a salt mixture is chosen so that there is a small temperature band in which the salt and the metal are both liquid. If the bulk metal temperature is held above the salt's boiling point, the salt will boil if it penetrates the liquid to too great a depth. Thus, the salt and metal are kept separate. This together with the fact that oil and salt are non-miscible and the specific gravities of oil, salt and steel are 1, 2 and 6, respectively, keeps the liquids separate.

Figures 8, 10:
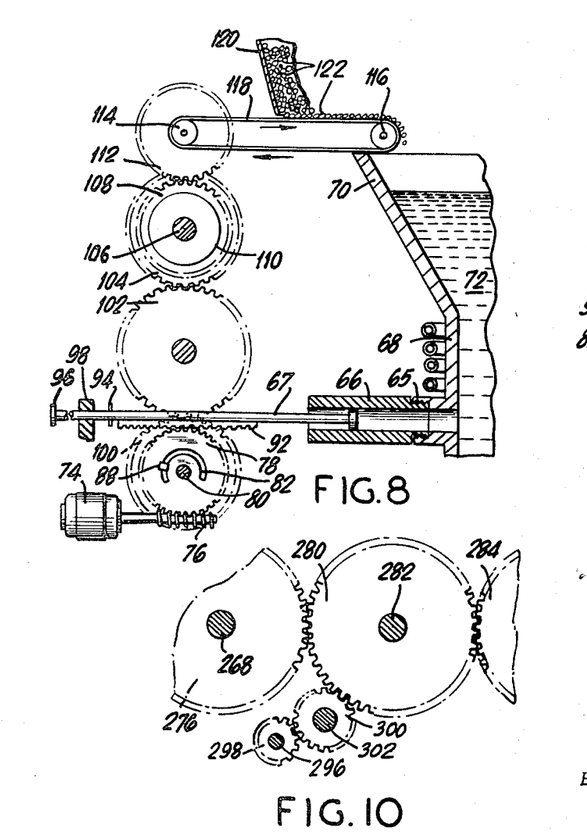
FIG. 8 is an elevational view of the automatic feed mechanism and leveling means with some parts broken away and in cross section, and some parts shown diagrammatically.
FIGS. 9 and 10 are cross-sectional views taken on lines 9—9 and 10—10 of FIG. 1, respectively.

Automatic means are provided to control the operation of level control piston 67 and to feed additional material into melt M as the melt is used up, see FIG. 8. To this end a motor 74 mounted on any convenient fixed part of the apparatus, has a worm 76 drawing a worm wheel 78 mounted on a shaft 80. Worm wheel 78 is formed with an arcuate slot 82 in the outside face thereof having a pair of end walls 84 and 86. A toggle-type switch 88 is mounted adjacent slot 82 and positioned so that its toggle 90 is alternately moved one way and then the other by end walls 84 and 86 as wheel 78 reciprocates on shaft 80. The function of switch 88 appears below.

Fixed to shaft 80 for rotation therewith, is another gear which meshes with a rack 92 fixed to shaft 80. The tooth length of rack 92 is substantially equal to the peripheral length of the gear that drives it for a reason appearing below. Fixed to piston rod 67 are front and rear safety stops 94 and 96 positioned on either side of a fixed rod guide 98.

Also fixed to shaft 80 for rotation therewith is a gear 100 which meshes with an idler 102. Idler 102 meshes with a gear 104 mounted on a shaft 106, on which is also mounted a gear 108. Gears 104 and 108 are interconnected by a magnetic clutch 110, for a reason appearing below. Gear 108 meshes with a gear 112 which directly rotates a pulley 114. Another pulley 116 is positioned over funnel portion 70 of member 30. An endless feed belt 118 is mounted on pulleys 114 and 116. Positioned over the top run of belt 118 is a feed hopper 120 in which replenishment stock 122 of the material being used in melt M is stored. In the case of steel and the like, stock 122 is preferably in the form of pellets. As is now obvious, when motor 74, through the above described gear train, drives gear 108 to drive the belt in the direction of the arrows, belt 118 will dump stock or pellets 122 into funnel portion 70, and the stock will fall, by gravity, through oil 72 and liquid salt 28 into the melt where it will liquify due to heating coils 24 to thereby replenish the melt. A guard 119 is provided in member 30 to protect plate 58 from the falling pellets.

Figure 1:
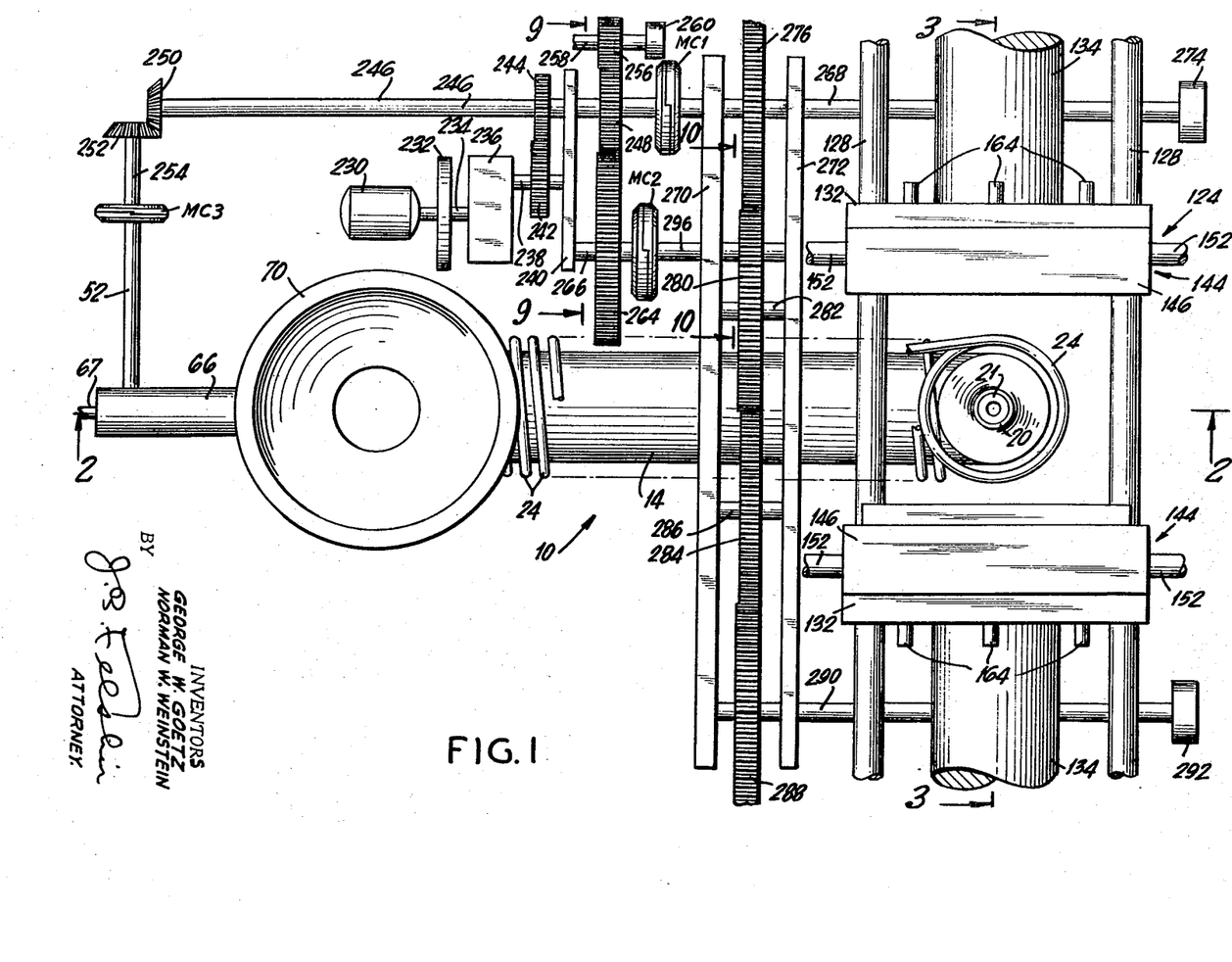
FIG. 1 is a top plan view of an apparatus embodying the invention with some parts broken away and some parts shown diagrammatically.
Figures 3, 5, 6:
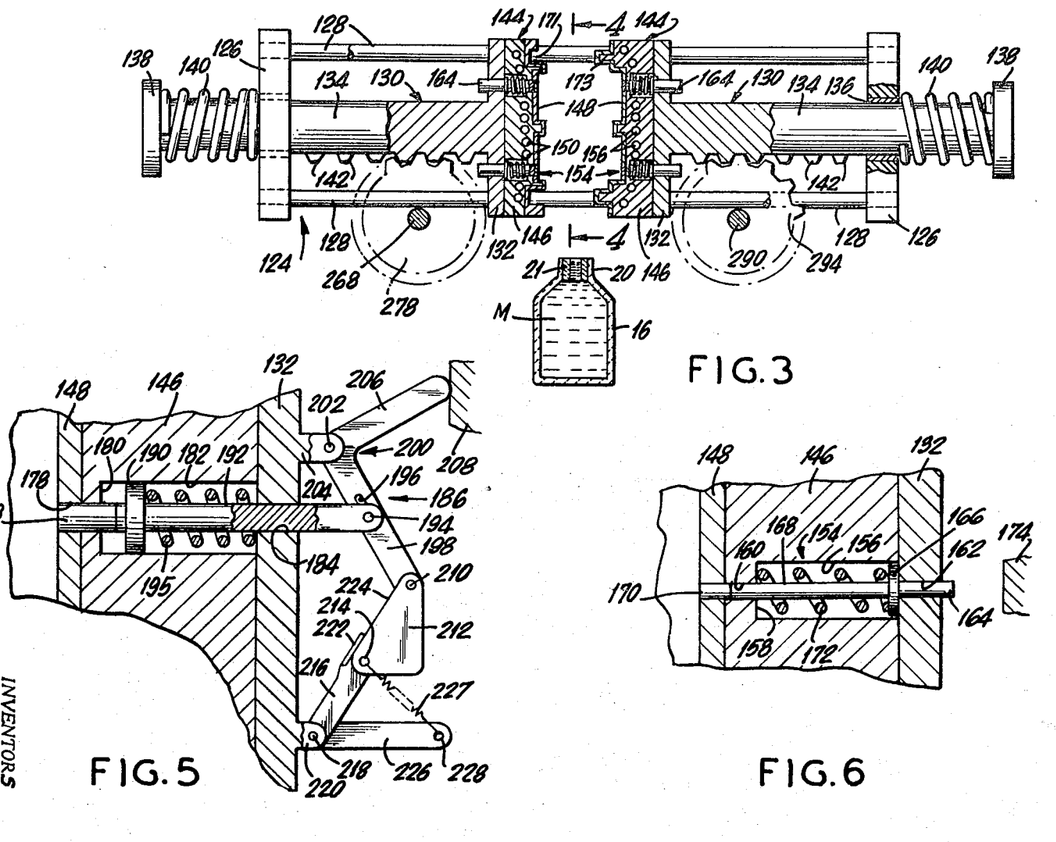
FIGS. 5 and 6 are cross-sectional views taken on lines 5—5 and 6—6 of FIG. 4, respectively.

Means are provided to mold or die cast the drop or bolus after it is expelled from nozzle 20, FIGS. 1 and 3. To this end a mold guiding and supporting assembly 124 is mounted above nozzle 20. Assembly 124 comprises a pair of fixed end plates 126, which may be square, interconnected by four mold guide and support rods 128, one at each of the respective corners of the end plates. Mounted on assembly 124 for sliding movement towards and away from each other, are a pair of mold carrier assemblies 130. Each assembly 130 comprises a mold carrier plate 132, which plates are in facing relation. Plates 132 are formed with suitable openings receiving guide rods 128. Extending outwardly from each plate 132 is a driving rod or piston 134 which passes through suitable openings in end plates 126 and are guided therein by bushings 136, and which terminate in end stops 138. Wrapped around each piston 134 and positioned between each respective pair of stops 138 and end plate 126 is a coil compression die return spring 140. Springs 140 normally bias the plates 132 outwardly, away from each other. The underside of each rod 134 is formed with gear teeth 142 which function as a rack, as appears more fully below.

Removably mounted, by any suitable means, on each of the facing surfaces of plates 132 is a mating mold or die half 144. The mold half body 146 of each mold half 144 is specially made for each particular casting or part to be produced, but it is a permanent mold and is used again and again to produce the same casting, and may be made of copper or the like material. When working steel, the inside face surfaces of the mold half bodies 146 are provided with die faces of 310 Stainless Steel or an equivalent material to protect the die halves from the high temperature of the bolus. It must withstand pressure of 1,000 pounds per square inch for a minimum of 1000 cycles at maximum die temperatures encountered (2200° F.) for steel. The die facing must not oxidize or creep excessively at the working temperatures. A formula to approximate the minimal required tensile strength of the die facing in p.s.i. at any temperature and was derived from estimated stresses due to liquid metal flow is:

$$\frac{(2300-T)}{2.7}$$

where T is the temperature at which the die material is tested in ° F., result is in pounds per inch square. Other materials can be used for the die facing depending on the material worked. Most steels are adequate for the facing when aluminum is worked.

Means are provided to cool the mold halves. To this end the bodies 146 are provided with a plurality of interconnecting openings 150 which are connected to suitable fluid conduits 152, FIG. 4. Cold water or other coolant is circulated through these openings by conventional means not shown. If desired, the bodies may be cast around a pattern or network of tubing to supply coolant to the mold halves. The mold halves are also provided with vent openings, not shown, as is usual in the art.

The mold halves are provided with ejector pin means 154, FIG. 6, to urge the completed casting out of the mold at the end of each cycle. The mold body 146 is formed with an opening 156 extending from the rear face of the body and terminating in an end wall 158 which is in spaced relation to die facing 148. A smaller opening 160 extends from the working face of facing 148 to end wall 158. Another opening 162, similar to opening 160 and in alignment therewith, extends through plate 132. A pusher pin 164, having a length which is greater than the thickness of plate 132 by some predetermined amount depending on the nature of the work, extends through opening 162 and terminates in a stop flange 166 which is normally positioned against the inside surface of plate 132. Extending forwardly of flange 166 is an ejector pin 168 which has a length substantially equal to the thickness of body 146 and facing 148. Pin 168 has a tip 170 which is preferably made of the same material as facing 148. The outer end surface of tip 170 is preferably flush with the adjacent portions of facing 148. A coil compression spring 172 is located in opening 156 around pin 168 with one end contacting wall 158 and the other end contacting flange 166 to normally bias the pin to the right, looking at FIG. 6. A fixed stop member 174 is provided and suitably positioned in the path of opening motion of the mold to push the tip 170 against the finished casting to eject the same against the force of spring 172, which spring thereafter returns the pin assembly to the position of FIG. 6 during the mold closing motion in preparation for the next cycle.

As will be clear to those skilled in this art, the number of ejector pins required will be dictated by the configuration of the parts being produced. For the sake of example, see FIG. 4, a part shaped like a wheel having a hub and four spokes has been illustrated. Since this part is symmetrical about the plane of the parting line as well as a number of planes perpendicular thereto, four equally spaced ejector pins are shown in each mold half. If the part is asymmetrical about the plane of the parting line and will always come off on one mold half, then only that mold half need be provided with ejector pins.

In certain cases it may be possible to eliminate the ejector pins entirely by supplying air under pressure to the vent holes to free the casting from the mold.

Means are provided to form a "flash" cavity to allow space for any excess material in the bolus over that needed for the casting. To this end one die half is formed with a groove 171 into which a projection 173 on the other die half fits. Projection 173 fits into groove 171 easily so that a narrow U shaped space is formed between them. This narrow space is the flash cavity.

Means are provided to compensate for the shrinkage of the bolus as it cools within the closed mold to eliminate flaws in the casting. To this end the mold is provided with at least one passage 176, FIG. 4 (the number being dictated by the casting material and the configuration of the part) communicating with the casting cavity and also having a tubular opening 178, FIG. 5, extending through facing 148 and a predetermined distance into body 146. Opening 178 terminates at an end wall 180 of a larger concentric opening 182 which extends the remainder of the way through body 146. An opening 184, similar to and aligned with opening 178 communicates with opening 182 and extends through plate 132. A pressure pin assembly 186 is mounted on the rear surface of plate 132 and the openings 178, 182 and 184. Assembly 186 comprises a front pressure pin 188 slidably mounted in opening 178. Pin 188 preferably comprises the same material as facing 148. Tip 188 terminates at a flange 190 slidably mounted in opening 182. Extending rearwardly from flange 190 is a rear pressure pin 192 which has a pivot pin 194 in its outer end. A relatively strong coil compression spring 195 is wrapped around pin 192, and has one end bearing against flange 190 and the other end bearing against plate 132. Thus, spring 195 biases the pressure pin to the left as seen in FIG. 5. Pin 194 is slidably and pivotally received in a slot 196 formed in a leg 198 of an L shaped cocking lever 200.

The turn in link 200 is pivoted as at 202 on a rearwardly extending lug 204 provided on the rear face of plate 132. The outer end of the second leg 206 of link 200 will strike a fixed stop 208 positioned in the path of mold opening movement of said outer end. Stops 174, 208 and other stops (not shown) define the limits of mold opening movement. The outer end of the first leg 198 is pivoted as at 210 to a weighted link 212, which is also pivoted as at 214 to one end of a locking link 216. The other end of locking link 216 is pivoted as at 218 to a second lug 220 on plate 132. Link 216 also comprises a stop tab 222 adapted to contact an edge 224 of link 212 when the parts are in the cocked position of FIG. 5. Fixed to lug 220 is a spring anchor bar 226. A relatively weak coil tension spring 227 is connected between pivot point 214 and a pin 228 on the outer end of bar 226.

In FIG. 5, the mold halves are open, and leg 206 has hit stop 208 to return pin 188, against the force of spring 195, so that the outer end of this pin is flush with the die facing. Spring 227 pulls pivot 214 a small predetermined distance to the right and below the straight line described by pivot points 210 and 218. Tab 222 contacts edge 224 to hold pivot 214 at no more than said predetermined distance away from said line. This is an over-center toggle mechanism.

Upon impact of the mold halves, by means described below, the mass of weighted link 212 causes pivot 214 to move to the other side of said line against the force of spring 227. This occurs approximately 1/1000 of a second after the impact of the two die faces meeting.

The mold is now closed, the cavity sealed and the casting is cooling and contracting therein. The motion upon impact of the over-center toggle releases the pressure pin and thereby permits spring 195 to urge pin 188 into cavity 176 to supply melt therefrom to the main die cavity to compensate for shrinkage.

The sprue formed in cavity 176, as well as the tits formed in the vent holes, the marks of the ejector pins if any, and the flash, if any, are easily removed from the finished casting, as is well known. Other shrinkage compensating means, such as air pressure, may be used in place of pressure pin assembly 186.

Figure 9:
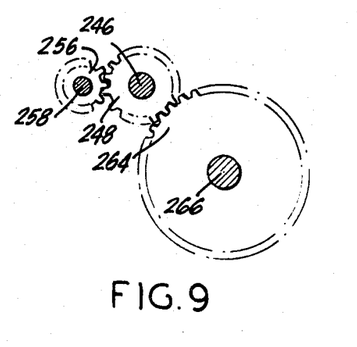
Figure 12:
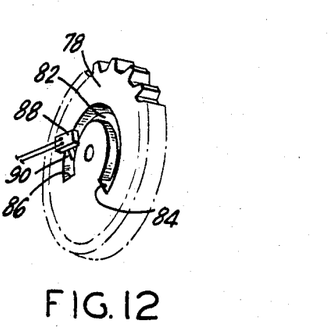
FIG. 12 is a perspective view of a detail of FIG. 8.

Power means are provided to move the mold halves toward each other around the bolus, and to move dispenser plunger 38, FIG. 2. A motor 230 drives a flywheel 232 and the input shaft 234 of a speed reducer 236. The output shaft 238 of reducer 236 is rotatably mounted on a fixed support 240 and carries a gear 242. Gear 242 drives a gear 244 and shaft 246 which is supported in support 240 and also carries a gear 248, FIG. 9. Shaft 246 terminates at one end at one side of an electromagnetic clutch MC1; and at the other end in a bevel gear 250. Bevel gear 250 drives a bevel gear 252 attached to one end of a shaft 254, the other end of which shaft is attached to one side of an electro-magnetic clutch MC3. The other side of clutch MC3 is attached to shaft 52 which drives gear 50, in FIG. 2, to operate the dispenser piston 38.

Gear 248 drives a gear 256 on a timing cylinder shaft 258 which is supported in a bearing 260 to drive a timing cylinder 262 (FIG. 13), for purposes which will appear more clearly below.

Gear 248 also drives a gear 264 which is on a shaft 266, one end of which is mounted on support 240, and the other end of which terminates at one side of an electro-magnetic clutch MC2.

The other side of clutch MC1 is attached to a shaft 268 which is supported in two intermediate supports 270, 272 and an end support 274. Shaft 268 carries a gear 276 (FIG. 10) and a gear 278 (FIG. 3) which meshes with the teeth 142 on one of the driving rods 134. Gear 276 drives an idler 280 mounted on shaft 282 which is supported between supports 270 and 272. Idler 280 drives an idler 284 mounted on a shaft 286 which is supported between supports 270 and 272. Idler 284 drives a gear 288 mounted on a shaft 290 which is supported on supports 270 and 272, and an end support 292. Shaft 290 also carries a gear 294 (FIG. 3) which meshes with teeth 142 on the other driving rod 134.

Thus, motor 230 drives shafts 268 and 290 in opposite directions to drive the mold halves together through a first gear train including clutch MC1 as follows: gear 242 and 244, shaft 246, MC1, shaft 268, gear 276, idlers 280 and 284, gear 288, and shaft 290.

Attached to the other side of clutch MC2 is shaft 296 which is supported in supports 270 and 272, and which carries a gear 298, FIG. 10. Gear 298 drives an idler 300 mounted on an idler shaft 302. Idler 300 also meshes with idler 280.

Thus motor 230 also drives shafts 268 and 290 through a second gear train including clutch MC2 as follows: gears 242 and 244, shaft 246, gear 248, gear 264, shaft 266, MC2, shaft 296, gear 298, idlers 300 and 280; then to both gear 276 and shaft 268 on one side; and to idler 284, gear 288 and shaft 290 on the other side.

The purpose of these two parallel gear trains will appear below.

Figure 13:
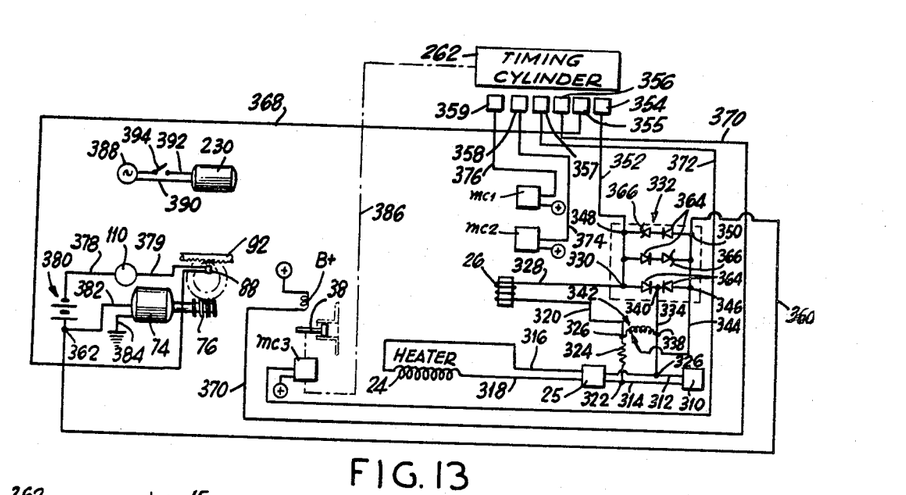
FIG. 13 is a drawing of the electrical system of the present invention.

Means are provided to supply power to and control the operation of the various parts of the apparatus, FIG. 13. To this end a motor-generator set 310, connected to a usual source of 110 v. A.C. 60 cycle current (not shown), produces high frequency electricity through a pair of lines 312 and 314 that connect to temperature controller 25. A pair of lines 316, 318 connect controller 25 to the high frequency induction heating means 24.

A line 320 extends from a junction 322 in line 314 through a resistor 324 and a junction 326 to one side of neck coil 26. The other side of coil 26 is connected by line 328 to a junction 30 in a balancing and rectifying circuit 332. Line 334 extends from a junction 336 in line 312 through a junction 338 to a junction 340 in circuit 332. Connected across junctions 326 and 338 is the coil of variable impedance or choke 342. The movable member of choke 342 is connected by a line 344 to a junction 346 in circuit 332. Circuit 332 includes two additional external junctions 348 and 350. Junction 348 is connected by a line 352 to a spring loaded brush 354 that cooperates with timing cylinder 262 as will appear below. Cylinder 262 includes five additional spring loaded brushes 355 to 359 inclusive. A line 360 connects junction 350 to a junction 362.

Circuit 332 comprises four diodes 364 and two Zener diodes 366 which act as safeties to prevent too high a voltage being sent to motor 74, and suitable internal connections interconnecting these components and junctions 330, 340, 346, 348 and 350 as shown for a purpose appearing below.

A line 368 connects brush 355 to one side of switch 88. A line 370 connects brush 356 to one side of the coil of solenoid BF, and the other side of said coil is connected to the plus side of the output of the rectified current (D.C.), indicated by the symbol +. Lines 374 and 376 connect brushes 358 and 359 to one side of each of the coils of clutches MC2 and MC1, respectively, and the other side of each of said coils is connected to power at +.

The other side of switch 88 is connected by a line 379 to one side of the coil of clutch 110, and a line 378 connects the other side of said coil to a battery 380. The other side of said battery is connected to junction 362. A line 382 connects junction 362 to one side of motor 74, and the other side of said motor is connected to ground by a line 384.

The mechanical connections between piston 38, clutch MC3, and cylinder 262 shown in FIG. 1, is indicated in FIG. 13 by dotted line 386.

Motor 230 is separately circuited, as shown in FIG. 13, and is connected to a suitable source of AC electricity 388 by a line 390, and a line 392 having an on-off switch 394 therein.

Figure 14:
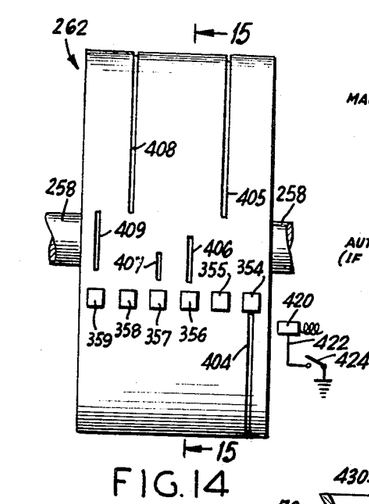
FIG. 14 is a view of the timing cylinder.
Figures 15, 17:
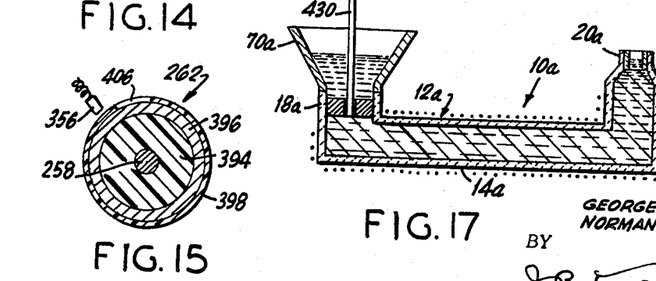
FIG. 15 is a cross-sectional view taken on line 15—15 of FIG. 14 on a smaller scale.
FIG. 17 is a view similar to FIG. 2 showing a modified construction.

Referring to FIGS. 14 and 15, cylinder 262 comprises an insulating core 394 secured to shaft 258, on which is a layer or coating 396 of a conducting material such as copper. On top of layer 396 is a thin layer 398 of durable insulating material such as Mylar. Layer 398 is formed with six slots 404 to 409 inclusive. The six slots extend around the cylinder in the direction of its rotation, and they are of predetermined lengths and in a predetermined angular positional relationship to each other. Each slot is associated with one of six brushes, 354 with 404, etc., and a circuit may be completed through the brush and the layer 396 when the brush is urged by its spring through the slot into contact with said conducting layer.

Means are provided to ground layer 396. To this end a spring loaded brush 420 is positioned to contact an edge of layer 396, at an end face of cylinder 462, and this brush is grounded via a line 422 having an on-off switch 424 interposed therein.

In FIG. 17 is shown a modified construction particularly adapted for use when casting metals such as aluminum which have relatively low melting temperatures compared to that of steel. The basic difference is that because of the lower working temperatures the piston can work directly on the melt rather than through the bodies of oil and salt.

The machine 10a of FIG. 17 is the same as the machine 10 described above except that a piston 430 which is preferably made of stainless steel, replaces the dispenser piston of machine 10, and the drive train is relocated and modified to drive piston 430. Level control is accomplished by adding replenishment pellets. The die assembly and the power drive and controls therefore is the same as for machine 10. Chamber 12a is all one piece and of ceramic material, separate member 30 being omitted. Chamber 12a comprises a nozzle 20a, a cross-arm 14a, and a leg 18a in which piston 430 operates, and a funnel-shaped portion 70a in which replenishment stock is fed.

OPERATION

First motor-generator set 310 is started and allowed to run until the melt is liquid. Then switch 394 is closed, starting motor 230 and the power drive shown in FIG. 1. Nothing else happens even though cylinder 262 is turning because switch 424 is open, thereby preventing completion of the six circuits controlled by the six brushes on the cylinder. Motor 230 is allowed to run with no load until the flywheel 232 is up to operating speed, whereupon switch 424 may be closed to start cycling.

Each die will require a different size and weight bolus within the capacity of the apparatus. Before each run, initial correction is made by adjusting the stroke length of dispenser piston 38 by any well known means. Fine correction is made by adjusting the automatic leveling means to move the melt to a predetermined height in nozzle 20. Adjustable impedance 342 is used for this. The higher the melt is in nozzle 20, the greater the voltage drop across the coil 26. Circuit 332 compares the voltage drop across coil 26 with the voltage drop across variable impedance 342. So long as the voltage drop across the coil is less than the preset voltage drop at 342, current of one polarity is sent through line 360. This current of this prolarity causes motor 74 to rotate shaft 80 clockwise, FIG. 8, to move piston 67 in, to increase the pressure head on the left, FIG. 2, to thereby increase the height of the melt in the nozzle. If the level of the melt in nozzle 20 should go above this predetermined height, then circuit 332 will send current of the opposite polarity to motor 74, to run said motor in the opposite direction to lower the height of the melt in the nozzle. This action continues until the voltage drop in coil 26 equals the voltage drop at 342. Thus, the setting of 342 corresponds to the desired correct height in the nozzle, which height and setting is determined before the apparatus is permitted to run automatically by one or more test ejections.

Figure 16:
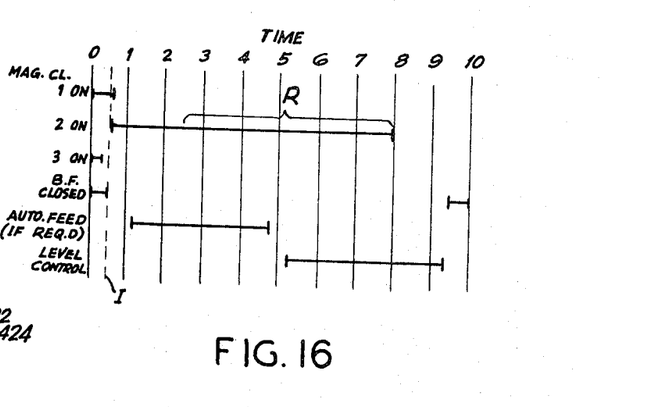
FIG. 16 is a timing diagram.

Referring now to FIG. 16, the timing is represented during automatic operation of the apparatus. The horizontal bars indicate the times the various parts of the apparatus, noted on the left of the chart, are activated. The chart represents one cycle. The horizontal axis represents time and is divided into ten equal intervals, which intervals can correspond to seconds, depending upon the speed of cylinder 262.

At the beginning of each cycle, the butterfly valve BF is closed, having been closed near the end of the previous cycle. During the first time interval MC1 and MC3 are actuated by their respective brushes on cylinder 262. Actuation of MC3 causes rotation of shaft 52 which causes piston 38 to move in, FIG. 2. Since plate 58 has sealed member 30, piston 38, acting through salt body 28, causes a bolus to be forcibly expelled from the nozzle upwardly between the die halves. MC3 is released during this first time interval, which allows spring 40 to return piston 38 in preparation for the next cycle.

The vertical dotted line indicated by I in FIG. 16 represents the instant of impact of the dies. Actuation of MC1 causes the dies to move together through the first gear train described above. The die halves close as the bolus is in flight, and the timing is such that the dies close on the bolus when it is at the center of gravity of the die cavity, at which time it is also at rest in its free fall, conditions that are desirable, not essential.

Just before impact, the butterfly valve is opened.

Right after impact, still in the first time interval, MC2 is actuated and holds the dies together through the second gear train described above. At the time MC2 is actuated, or only a very small time thereafter, MC1 is released. The first and second gear trains have different mechanical advantages. The MC1 chain has a smaller mechanical advantage to close the dies quickly and close them on the bolus to form the casting. The MC2 chain is used to hold the dies together while the casting solidifies.

MC2 releases some time in or between the third and eighth time intervals indicated by the bracket marked R. More time is needed for heavier castings to cool.

From the beginning of the sixth to the beginning of the tenth time intervals, circuit 332 is actuated to actuate the automatic levelling piston 67, as described above, to bring the melt height in the nozzle up to the predetermined height in preparation for the next cycle.

In the tenth interval and after the level control has been operated, solenoid BF is closed in preparation for the next cycle.

After some number of cycles, piston 67 will be at the right end of its travel, FIG. 8. This number of cycles varies according to the weight of the casting. It must be at least one for the heaviest castings the machine can handle, and it can be any number greater than one within the tolerance of accuracy of the apparatus and the limitations of practicability. When the piston is in this right hand position, the melt will require replenishment, and worm wheel 78 will be rotated to its clockwise end so that end wall 86 of slot 82 will trip toggle 90 of switch 88 to its second position.

Referring to FIGS. 13, 14 and 16, during and between the second and fifth time intervals only, this permits a circuit to be completed to motor 74 as follows: from ground through line 422, switch 424 and brush 420, to coating 396, to brush 355, line 368, switch 88, line 379, clutch 110, line 378, battery 380, junction 362 and line 382 to motor 74. Battery 380 is arranged so that the current it supplies to motor 74 is of a polarity so that piston 67 is pulled out to drop the liquid levels. At this same time, the coil of clutch 110 is actuated to thereby drive belt 118 to feed replenishment stock 122 from hopper 120 into funnel 70. Means are provided to cause the amount of replenishment stock to equal the amount of material used up between feedings, for example, by providing an adjustable hopper outlet opening and/or by adjusting the distance of the hopper from the belt. At the end of the feeding cycle, end wall 84 pushes toggle 90 back to its first position breaking the above described circuit and conditioining motor 74 to be run from current supplied by circuit 332 for levelling as described.

If desired, a separate motor, operated by the same circuit with switch 88, can replace idler 102 and clutch 110.

It will thus be seen that there is provided a method in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative.

The apparatus may be operated under vacuum to minimize formation of bubbles in the casting. The die faces may be coated with substances such as carbon black to prevent welding of the casting to the die faces.

We claim:

1. A method for casting metals in a permanent mold comprising the steps of ejecting a molten bolus of the metal, into free fall in space, and closing said mold around at least a major portion of said bolus while in free fall.

2. A method for casting metals in a permanent mold comprising the steps of ejecting a liquid molten mass of the metal, into free fall in space, and enveloping at least a major portion of said mass while in free fall, in which the mass is ejected upwardly into free fall and said mass is enveloped and molded by closing die means on said mass while in free fall.

3. The method of claim 1, in which said mass is ejected from a chamber containing said liquid metal, and adjusting the level of the molten metal in said chamber to a predetermined level before ejecting said mass.

4. The method of claim 3, feeding additional metal to said molten metal in said chamber, and coordinating timing of the steps of feeding metal and adjusting the level, so that the feeding occurs before the level adjusting in a casting cycle.

References Cited

UNITED STATES PATENTS

| | | | |
|---|---|---|---|
| 2,879,566 | 3/1959 | Pond | 164—82 |
| 3,367,394 | 2/1968 | Röder et al. | 164—136 X |
| 3,399,715 | 9/1968 | Harders et al. | 164—82 X |

J. SPENCER OVERHOLSER, Primary Examiner

R. SPENCER ANNEAR, Assistant Examiner

U.S. Cl. X.R.

164—335